United States Patent
Hsieh et al.

(10) Patent No.: US 7,623,179 B2
(45) Date of Patent: Nov. 24, 2009

(54) STORAGE MEDIUM AND METHOD TO CONTROL AUTO EXPOSURE BY THE SAME

(75) Inventors: Wen-Hung Hsieh, Hsinchu (TW); Ching-Jung Tsai, Taichung (TW); Shu-Chen Hsiao, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 476 days.

(21) Appl. No.: 11/786,561

(22) Filed: Apr. 12, 2007

(65) Prior Publication Data

US 2007/0248346 A1 Oct. 25, 2007

(30) Foreign Application Priority Data

Apr. 25, 2006 (TW) .............................. 95114682 A

(51) Int. Cl.
*H04N 5/238* (2006.01)

(52) U.S. Cl. ................. 348/364; 348/221.1; 348/229.1; 348/362; 396/159

(58) Field of Classification Search ............. 348/221.1, 348/229.1, 362, 364; 396/159
See application file for complete search history.

(56) References Cited

U.S. PATENT DOCUMENTS

| | | | |
|---|---|---|---|
| 5,696,840 A * | 12/1997 | Usami | 382/167 |
| 6,463,172 B1 * | 10/2002 | Yoshimura | 382/162 |
| 6,839,087 B1 * | 1/2005 | Sato | 348/362 |
| 2002/0167596 A1 * | 11/2002 | Suzuki et al. | 348/223.1 |
| 2003/0164810 A1 * | 9/2003 | Kim | 345/63 |
| 2004/0130555 A1 * | 7/2004 | Ko et al. | 345/589 |
| 2005/0275747 A1 * | 12/2005 | Nayar et al. | 348/362 |

\* cited by examiner

*Primary Examiner*—Lin Ye
*Assistant Examiner*—Temitope Adeyiga
(74) *Attorney, Agent, or Firm*—Thomas, Kayden, Horstemeyer & Risley

(57) ABSTRACT

A method and a storage medium for auto exposure control are provided. A desired image is divided into a plurality of sample blocks, each includes red, green, and blue subpixels. A maximum exposure ratio and an average exposure ratio are obtained according to the maximum and average values of each red, green, and blue subpixel retrieved from each sample block and a predetermined desired maximum brightness and a predetermined desired average brightness. It is determined whether the maximum exposure ratio is smaller than the average exposure ratio. If it is, a strobe of the storage medium shines a flashlight based on the average exposure ratio, and, if it is not, the strobe shines a flashlight based on the maximum exposure ratio.

20 Claims, 3 Drawing Sheets

STORAGE MEDIUM AND METHOD TO CONTROL AUTO EXPOSURE BY THE SAME

RELATED APPLICATIONS

The application claims priority to Taiwan Application Serial Number 95114682, filed Apr. 25, 2006, which is herein incorporated by reference.

BACKGROUND

1. Field of Invention

The present invention relates to auto exposure. More particularly, the present invention relates to a method to control auto exposure with an image extraction apparatus.

2. Description of Related Art

Since virtual environments are complex, pictures of objects and backlight that are varied with time, using a digital camera with a flashlight to take the pictures are generally underexposed or overexposed. Thus, in such conditions the pictures are not satisfactory. To overcome this problem conventionally, a reference sample image is taken before the flashlight is turned on. Then, different companies have respectively different designs to calculate and configure parameters to shine the flashlight based on the reference sample image, the parameters such as flashing time period and light brightness. Thus, the flashlight is turned on and shines brightly for illumination based on the calculated flashing parameters. However, the aforementioned method cannot handle or control the resultant exposure of the object after the flashlight is activated. Therefore, underexposing or overexposing problems may still occur in some circumstances.

Therefore, there is a need to provide an improved image extraction apparatus and a method to control auto exposure to mitigate or obviate the aforementioned problems.

SUMMARY

An embodiment of a method to control auto exposure in accordance with the present invention is used for a strobe. The method comprises a step of splitting an image of desired picture into multiple sample blocks, where each of the sample blocks comprises multiple pixels, and each of the pixels comprises a first subpixel, a second subpixel and a third subpixel. The next step is to extract a maximum value between the first subpixels, a maximum value between the second subpixels and a maximum value between the third subpixels between the pixels of each sample block, and extract an average value between the first subpixels, an average value between the second subpixels and an average value between the third subpixels between the pixels of each sample block. The next step is to calculate respectively a first sum of maximum values based on the maximum values of the first subpixels, a second sum of maximum values based on the maximum values of the second subpixels and a third sum of maximum values based on the maximum values of the third subpixels of the sample blocks, and calculate respectively a first sum of average values based on the average values of the first subpixels, a second sum of average values based on the average values of the second subpixels and a third sum of average values based on the average values of the third subpixels of the sample blocks. Thus, a maximum sum exposure value is calculated based on the maximum one of the first sum of maximum values, the second sum of maximum values and the third sum of maximum values, and an average sum exposure value is calculated based on the maximum one of the first sum of average values, the second sum of average values and the third sum of average values. A maximum exposure ratio and an average exposure ratio are calculated based on the maximum sum exposure value, the average sum exposure value, a desired maximum brightness and a desired average brightness where the desired maximum brightness and the desired average brightness are configured by the user. The final step determines whether the maximum exposure ratio is smaller than the average exposure ratio. If the maximum exposure ratio is smaller than the average exposure ratio, the strobe shines the flashlight based on the average exposure ratio. Otherwise, the strobe shines the flashlight based on the maximum exposure ratio if the maximum exposure ratio is not smaller than the average exposure ratio.

An embodiment of a storage medium in accordance with the present invention comprises a processing system and a strobe. The processing system splits an image of a desired picture into multiple sample blocks, where each of the sample blocks comprises multiple pixels, and each of the pixels comprises a first subpixel, a second subpixel and a third subpixel. The processing system extracts a maximum value between the first subpixels, a maximum value between the second subpixels and a maximum value between the third subpixels between the pixels of each sample block, and extract an average value between the first subpixels, an average value between the second subpixels and an average value between the third subpixels between the pixels of each sample block. Also, the processing system calculates respectively a first sum of maximum values based on the maximum values of the first subpixels, a second sum of maximum values based on the maximum values of the second subpixels and a sum of maximum values based on the maximum values of the third subpixels of the sample blocks, and calculates respectively a first sum of average values based on the average values of the first subpixels, a second sum of average values based on the average values of the second subpixels and a third sum of average values based on the average values of the third subpixels of the sample blocks. Thus, a maximum sum exposure value is calculated based on the maximum value of the first sum of maximum values, the second sum of maximum values and the third sum of maximum values, and an average sum exposure value is calculated based on the maximum value of the first sum of average values, the second sum of average values and the third sum of average values. A maximum exposure ratio and an average exposure ratio are calculated based on the maximum sum exposure value, the average sum exposure value, a desired maximum brightness and a desired average brightness. Finally, the processing system determines whether the maximum exposure ratio is smaller than the average exposure ratio. If the maximum exposure ratio is smaller than the average exposure ratio, the strobe shines the flashlight based on the average exposure ratio. Otherwise, the strobe shines flashlight based on the maximum exposure ratio if the maximum exposure ratio is not smaller than the average exposure ratio.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
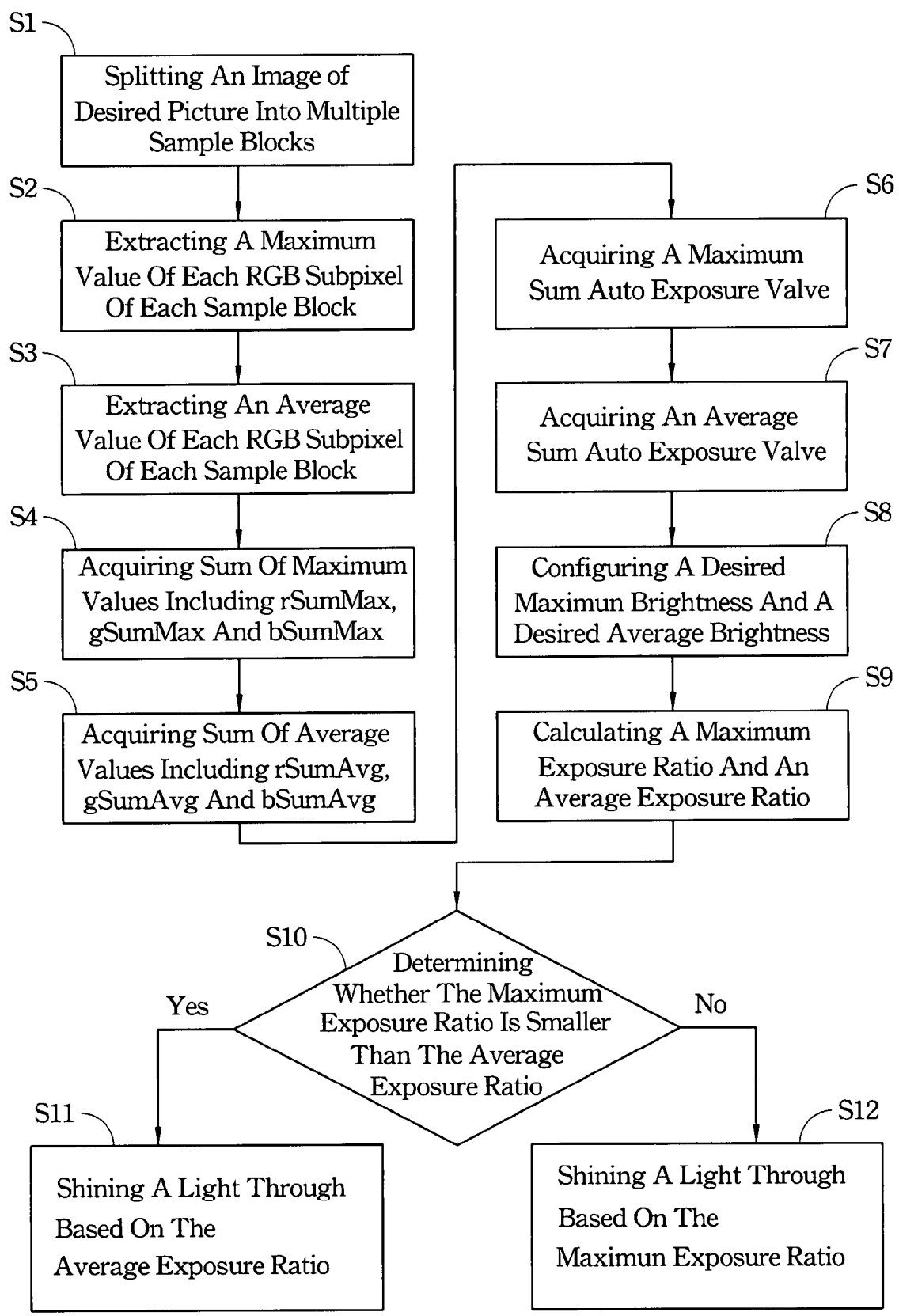
FIG. 1 is a flowchart of a method to control auto exposure in accordance with an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

An embodiment in accordance with the present invention discloses a method applied to a strobe of a storage medium for auto exposure control. In the embodiment, the method calculates maximum and average values of individual R, G, B subpixel values of each sample block to control auto exposure (AE). The values of the R, G, B subpixel are weighted after the calculation and are made between a desired maximum brightness and a desired average brightness. Wherein the desired maximum brightness is greater than the desired average brightness. The result of the maximum value calculation is treated as a condition for determining auto exposure control.

Refer to FIG. 1. FIG. 1 illustrates a flowchart of the embodiment in accordance with the present invention.

Figure 2:
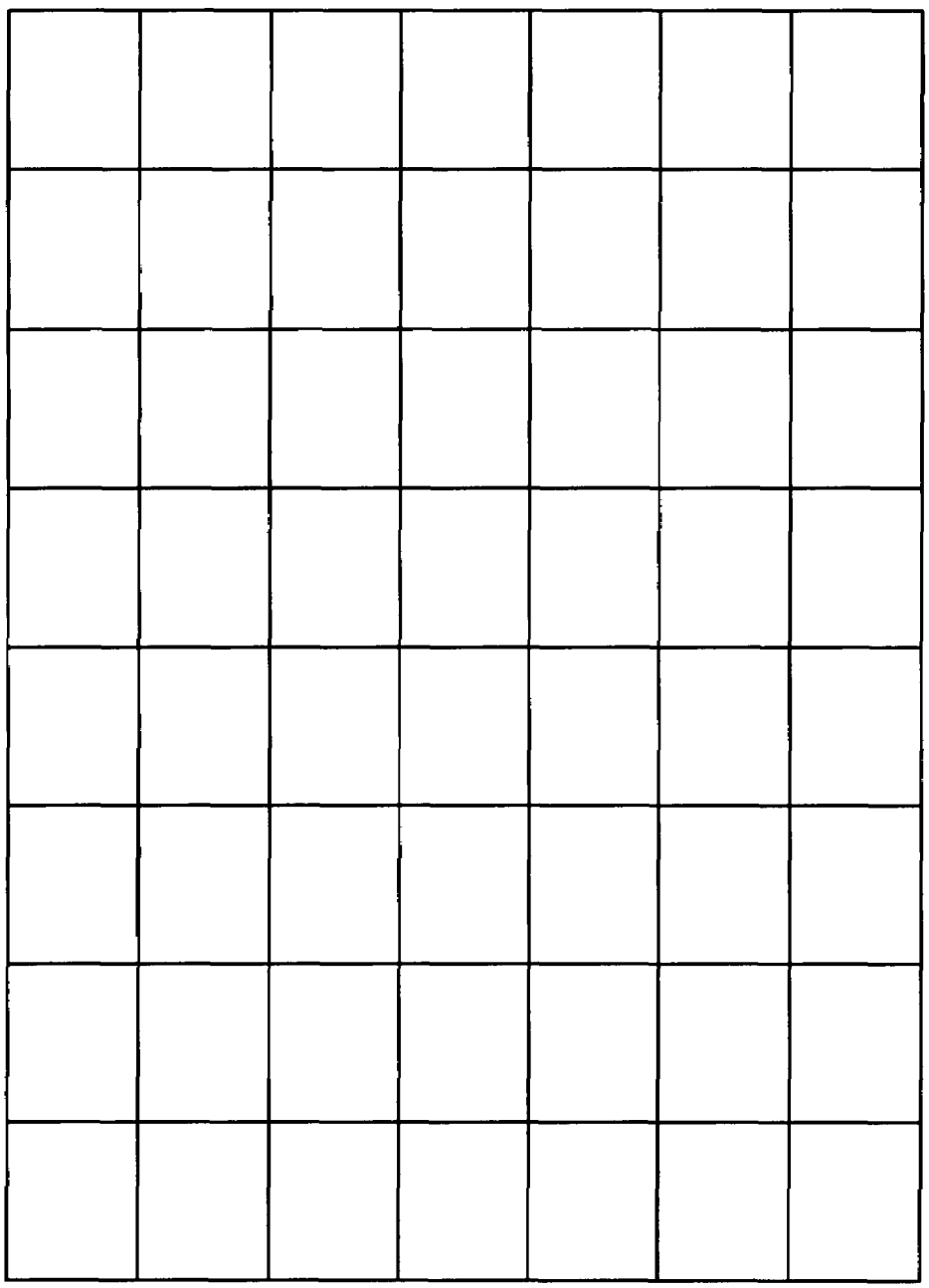
FIG. 2 is a schematic diagram of an image split into multiple sample blocks.

First, an original image of the desired picture is split into adequate numbers of sample blocks, as shown at step S1. In this embodiment, the original image is split into 56 sample blocks with the same sizes as shown in FIG. 2. For each sample block, the maximum subpixel R, G, B values of each pixel of the individual sample block are extracted, as shown as step S2. Since the pixels in different samples blocks have different parameters, and each pixel comprises three R, G, B subpixels including a R-subpixel, a G-subpixel and a B-subpixel, the maximum values of the R-subpixel, the G-subpixel and the B-subpixel of the pixels of each sample block can be extracted. For instance, a given sample block contains four pixels, and the values of the R-subpixel, the G-subpixel and the B-subpixel of the four pixels are presented as (125, 36, 96), (75, 89, 92), (37, 156, 63) and (56, 78, 122). Thus, the maximum values of the R, G, B subpixels of that sample block are respectively 125 for the R-subpixel, 156 for the G-subpixel and 122 for the B-subpixel. Therefore, the maximum values of the individual R, G, B subpixels of each sample block can be extracted through this way and denoted respectively as $rMax_1$, $rMax_2$, . . . , $rMax_{56}$ for the R-subpixel, $gMax_1$, $gMax_2$, . . . , $gMax_{56}$ for the G-subpixel and $bMax_1$, $bMax_2$, . . . , $bMax_{56}$ f for the G-subpixel.

After the values of the R, G, B subpixels have been extracted, average values of each individual R, G, B subpixel of each sample block can be calculated, as shown in step S3. Taking the aforementioned example, the average value of all the R-subpixel is $(125+75+37+56)/4=73.25$, the average value of all the G-subpixel is $(36+89+156+78)/4=89.75$, and the average value of all the B-subpixel is $(95+92+63+122)/4=93$ in the sample block. The average values are respectively denoted as $rAvg_1$, $rAvg_2$, . . . , $rAvg_{56}$ for the R-subpixel, $gAvg_1$, $gAvg_2$, . . . , $gAvg_{56}$ for the G-subpixel, and $bAvg_1$, $bAvg_2$, . . . , $bAvg_{56}$ for the B-subpixel.

The maximum values of the R, G, B subpixels between all sample blocks are respectively multiplied by weighted values ($w_i$), and the products are summed to obtain a sum of maximum values for each of the R, G, B subpixels, as shown in step S4. Those sums of maximum values are respectively denoted as rSumMax for the R-subpixel, gSumMax for the G-subpixel and B-SumMax for the B-subpixel. Taking the aforementioned example to illustrate, $rSumMax=rMax_1 \times w_1 + rMax_2 \times w_2 + \ldots + rMax_{56} \times w_{56}$, $SumMax=gMax_1 \times w_1 + gMax_2 \times w_2 + \ldots + gMax_{56} \times w_{56}$, and $bSumMax=bMax_1 \times w_1 + bMax_2 \times w_2 + \ldots + bMax_{56} \times w_{56}$. Likewise, The average values of the R, G, B subpixels of all sample blocks are respectively multiplied by weighted values ($w_i$), and the products are summed to obtain the sum of the average values for each of the R, G, B subpixels, as shown in step S5. Those sums of average values are respectively denoted as rSumAvg for the R-subpixel, gSumAvg for the G-subpixel and bSumAvg for the B-subpixel. Taking the aforementioned example to illustrate, $rSumAvg=rAvg_1 \times w_1 + rAvg_2 \times w_2 + \ldots + rAvg_{56} \times w_{56}$, $gSumAvg=gAvg_1 \times w_1 + gAvg_2 \times w_2 + \ldots + gAvg_{56} \times w_{56}$, and $bSumAvg=bAvg_1 \times w_1 + bAvg_2 \times w_2 + \ldots + bAvg_{56} \times w_{56}$.

When the values of rSumMax, gSumMax and bSumMax are acquired, the maximum of the three values is divided by the sum of weighted value ($w_{sum}$) to acquire a maximum sum auto exposure value, maxSumAe, as shown as step S6. That means $maxSumAe=MAX(rSumMax, gSumMax, bSumMax)/w_{sum}$. Likewise, the maximum one of the three sum of average values, rSumAvg, gSumAvg and bSumAvg, is divided by the sum of weighted value ($w_{sum}$) to acquire an average sum exposure value, avgSumAe, as shown as step S7. That means $avgSumAe=MAX(rSumAvg, gSumAvg, bSumAvg)/w_{sum}$. The next is to configure a desired maximum brightness and a desired average brightness, as shown in step S8. Configuring rules of the desired maximum brightness and the desired average brightness depend on practical demands. After the configuration of the desired brightness, a maximum exposure ratio and an average exposure ratio can be calculated with the maxSumAe and avgSumAe, as shown in step S9. The maximum exposure ratio is defined the quotient of dividing the desired maximum brightness by the maximum sum auto exposure value, maxSumAe (i.e. the maximum exposure ratio=the desired maximum brightness/maxSumAe), and is denoted as maxRatio. Likewise, the average exposure ratio is defined the quotient of dividing the desired average brightness by the average sum auto exposure value, avgSumAe (i.e. the average exposure ratio=the desired average brightness/avgSumAe), and is denoted as avgRatio. When the maxRatio and the avgRatio have been obtained, the values of the maxRatio and the avgRatio are compared with each other as shown in step S10. If the maxRatio is smaller than the avgRatio, making a flashlight based on the value of the avgRatio, as shown at step S11. Otherwise, if the maxRatio is not smaller than the avgRatio, making a flashlight based on the value of the maxRatio, as shown in step S12.

Figure 3:
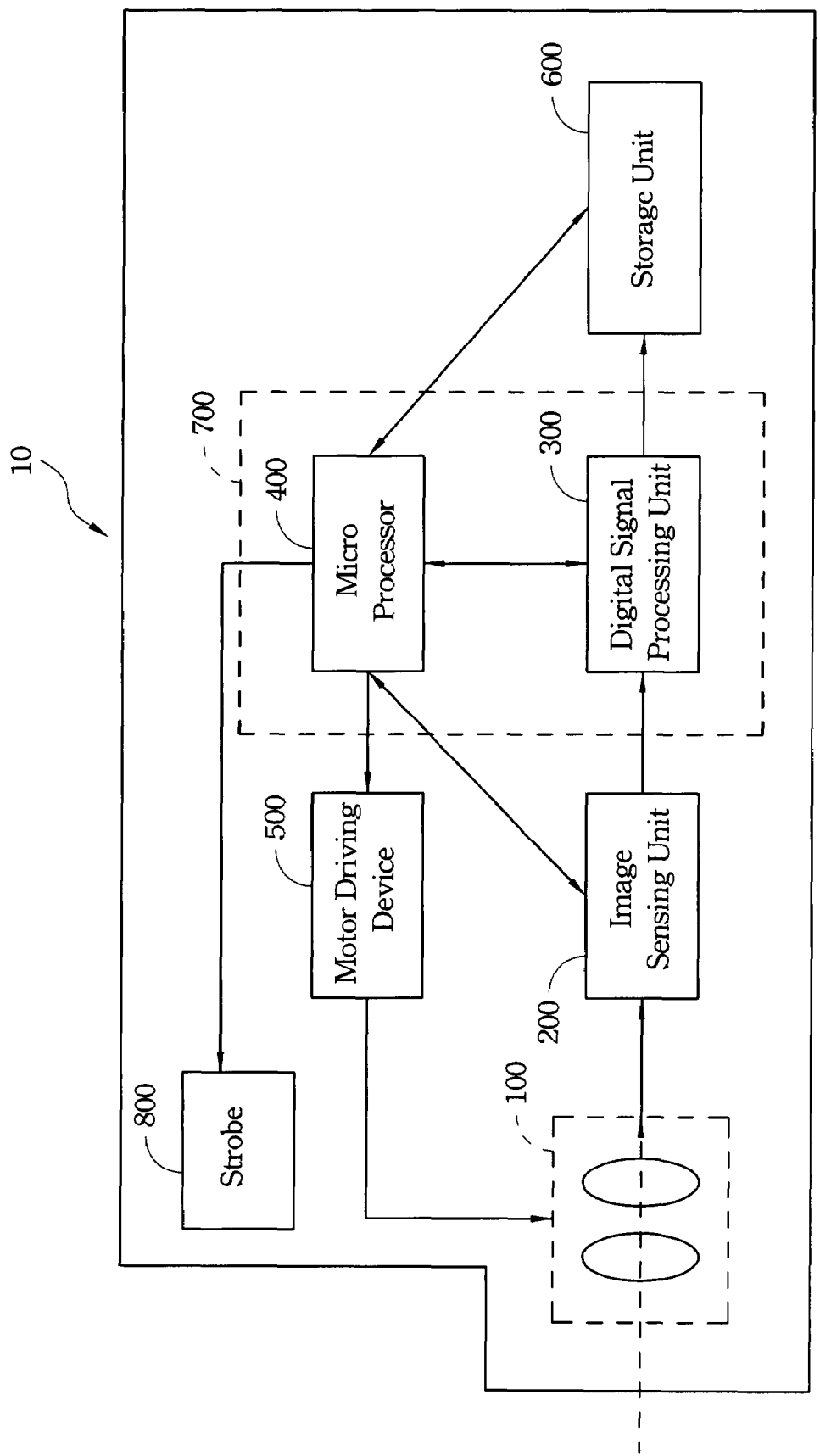
FIG. 3 is a schematic block diagram of an image extraction apparatus of an embodiment in accordance with the present invention.

Refer to FIG. 3. FIG. 3 illustrates an embodiment of a storage medium, for example an image extraction apparatus in accordance with the present invention. The image extraction apparatus 10 comprises a lens module 100, an image-sensing unit 200, a motor driving device 500, a storage unit 600, a processing system 700 and a strobe 800. The image-sensing unit 200 senses and captures image information. The processing system 700 comprises a microprocessor 400 and a digital signal processing unit 300. The microprocessor 400 receives image information, processes the image information and produces control signals. The digital signal processing unit 300 calculates image information data. The motor driving device 500 moves the lens module 100 or the image-sensing unit 200 to positions where the storage medium is focused. The storage unit 600 saves image data. The strobe 800 shines a flashlight based on the control signals of the microprocessor 400. In this embodiment, the aforementioned auto exposure method uses the digital signal processing unit 300 of the processing unit 700 to calculate image data. Then, the microprocessor 400 determines the calculated result by the digital signal processing unit 300 and configures exposing parameters to shoot the picture with the determined result controlling the auto exposure. The following disclosure describes the operation procedures of the processing unit 700, and descriptions related to other components are omitted.

The digital signal processing unit 300 splits an original image of a desired picture into multiple sample blocks. For conveniently illustrative purpose only, an image is split into 56 sample blocks as shown in FIG. 2. For each sample block, the maximum values and average values of individual R, G, B subpixels can be obtained, where the maximum values are respectively denoted as $rMax_1$, $rMax_2$, ..., $rMax_{56}$, $gMax_1$, $gMax_2$, ..., $gMax_{56}$, and $bMax_1$, $bMax_2$, ..., $bMax_{56}$, and the average values are respectively denoted as $rAvg_1$, $rAvg_2$, ..., $rAvg_{56}$, $gAvg_1$, $gAvg_2$, ..., $gAvg_{56}$, and $bAvg_1$, $bAvg_2$, ..., $bAvg_{56}$. Thus, the values of rSumMax, gSumMax, bSumMax, rSumAvg, gSumAvg and bSumAvg can be calculated by multiplication with weighed values $w_i$ and additions of the products as previously described. The digital signal processing unit 300 performs calculations to divide the maximum value of the rSumMax, gSumMax and bSumMax by $w_{sum}$ and denotes the quotient as maxSumAe that means the maximum sum exposure value. Likewise, the digital signal processing unit 300 performs calculations to divide the maximum value of the rSumAvg, gSumAvg and bSumAvg by the $w_{sum}$ and denotes the quotient as avgSumAe. The digital signal processing unit 300 calculates respectively based on the maxSumAe, the avgSumAe and a previous configured desired maximum brightness and a desired average brightness to produce the maximum exposure ratio and the average exposure ratio. As previously described, the maximum exposure ratio. is denoted as maxRatio and is defined the quotient of dividing the desired maximum brightness by maxSumAe. Likewise, the average exposure ratio is denoted as avgRatio and is defined the quotient of dividing the desired average brightness by avgSumAe. Thus, the microprocessor 400 compares the two values of the maxRatio and avgRatio. If the value of the maxRatio is smaller than the value of the avgRatio, the microprocessor 400 sends commands so that the strobe 800 shines the flashlight based on the value of the avgRatio for taking a picture. Otherwise, if the maxRatio is not smaller than the value of the avgRatio, the microprocessor 400 sends commands so that the image extraction apparatus shines the flashlight based on the value of the maxRatio for taking a picture.

Although this embodiment splits an image into 56 sample blocks of the same size, a person skilled in the art will recognize that the image can also be split into 56 sample blocks of different sizes. The auto exposure method in accordance with the present invention may be applied to any digital image extraction products that use an auto exposure algorithm. The method uses the maximum and the average values of the sample blocks to calculate, and configures the upper limit of the maximum value and the lower limit of the average value. Consequently, the method provides optimal exposure results and prevents exposure errors in some specific conditions.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method to control auto exposure for a strobe, and the method comprising splitting an image of a desired picture into multiple sample blocks, where each of the sample blocks comprises multiple pixels, and each of the pixels comprises a first subpixel, a second subpixel and a third subpixel;

extracting a maximum value between the first subpixels, a maximum value between the second subpixels and a maximum value between the third subpixels between the pixels of each sample block;

extracting an average value between the first subpixels, an average value between the second subpixels and an average value between the third subpixels between the pixels of each sample block;

acquiring respectively a first sum of maximum values based on the maximum values of the first subpixels, a second sum of maximum values based on the maximum values of the second subpixels and a third sum of maximum values based on the maximum values of the third subpixels of the sample blocks;

acquiring respectively a first sum of average values based on the average values of the first subpixels, a second sum of average values based on the average values of the second subpixels and a third sum of average values based on the average values of the third subpixels of the sample blocks;

acquiring a maximum sum auto exposure value based on a maximum one of the first sum of maximum values, the second sum of maximum values and the third sum of maximum values;

acquiring an average sum auto exposure value based on a maximum one of the first sum of average values, the second sum of average values and the third sum of average values;

configuring a desired maximum brightness and a desired average brightness;

acquiring a maximum exposure ratio and an average exposure ratio based on the maximum sum auto exposure value, the average sum auto exposure value, the desired maximum brightness and the desired average brightness;

determining whether the maximum exposure ratio is smaller than the average exposure ratio; and shining a flashlight either based on the average exposure ratio if the maximum exposure ratio is smaller than the average exposure ratio or based on the maximum exposure ratio if the maximum exposure ratio is not smaller than the average exposure ratio.

2. The method as claimed in claim 1, wherein the first sum of maximum values, the second sum of maximum values and the third sum of maximum values are calculated by multiplying respectively each of the maximum values of the first subpixels, the second subpixels and the third subpixels by a weighted value.

3. The method as claimed in claim 1, wherein the first sum of average values, the second sum of average values and the third sum of average values are calculated by multiplying respectively each of the average values of the first subpixels, the second subpixels and the third subpixels by a weighted value.

4. The method as claimed in claim 1, wherein the maximum sum auto exposure value is calculated by dividing the maximum of the first sum of maximum values, the second sum of maximum values and the third sum of maximum values by a first weighted value.

5. The method as claimed in claim 1, wherein the average sum auto exposure value is calculated by dividing the maximum of the first sum of average values, the second sum of average values and the third sum of average values by a second weighted value.

6. The method as claimed in claim 1, wherein the maximum exposure ratio is calculated by dividing the maximum sum auto exposure value by the desired maximum brightness.

7. The method as claimed in claim 1, wherein the average exposure ratio is calculated by dividing the average sum auto exposure value by the desired average brightness.

8. The method as claimed in claim 1, wherein the first subpixel is a R-subpixel, the second subpixel is a G-subpixel and the third subpixel is a B-subpixel.

9. A storage medium comprising
a processing system for splitting an image of a desired picture into multiple sample blocks, where each of the sample blocks comprises multiple pixels, and each of the pixels comprises a first subpixel, a second subpixel and a third subpixel, extracting a maximum value between the first subpixels, a maximum value between the second subpixels and a maximum value between the third subpixels between the pixels of each sample block, extracting an average value between the first subpixels, an average value between the second subpixels and an average value between the third subpixels between the pixels of each sample block, acquiring respectively a first sum of maximum values based on the maximum values of the first subpixels, a second sum of maximum values based on the maximum values of the second subpixels and a third sum of maximum values based on the maximum values of the third subpixels of the sample blocks, acquiring respectively a first sum of average values based on the average values of the first subpixels, a second sum of average values based on the average values of the second subpixels and a third sum of average values based on the average values of the third subpixels of the sample blocks, acquiring a maximum sum auto exposure value based on a maximum one of the first sum of maximum values, the second sum of maximum values and the third sum of maximum values, acquiring an average sum auto exposure value based on a maximum one of the first sum of average values, the second sum of average values and the third sum of average values, and acquiring a maximum exposure ratio and an average exposure ratio based on the maximum sum auto exposure value, the average sum auto exposure value, a predetermined desired maximum brightness and a predetermined desired average brightness, and determining whether the maximum exposure ratio is smaller than the average exposure ratio; and
a strobe for shining the flashlight either based on the average exposure ratio if the maximum exposure ratio is smaller than the average exposure ratio or based on the maximum exposure ratio if the maximum exposure ratio is not smaller than the average exposure ratio.

10. The storage medium as claimed in claim 9, wherein the processing system further comprising:
a microprocessor for receiving information of the image, processing the information, determining whether the maximum exposure ratio is smaller than the average exposure ratio, and producing control signals; and
a digital signal processing unit for calculating data of the information of image.

11. The storage medium as claimed in claim 9, wherein the first sum of maximum values, the second sum of maximum values and the third sum of maximum values are calculated by multiplying respectively each of the maximum values of the first subpixels, the second subpixels and the third subpixels by a weighted value.

12. The storage medium as claimed in claim 9, wherein the first sum of average values, the second sum of average values and the third sum of average values are calculated by multiplying respectively each of the average values of the first subpixels, the second subpixels and the third subpixels by a weighted value.

13. The storage medium as claimed in claim 9, wherein the maximum sum auto exposure value is calculated by dividing the maximum of the first sum of maximum values, the second sum of maximum values and the third sum of maximum values by a first weighted value.

14. The storage medium as claimed in claim 9, wherein the average sum auto exposure value is calculated by dividing the maximum of the first sum of average values, the second sum of average values and the third sum of average values by a second weighted value.

15. The storage medium as claimed in claim 9, wherein the maximum exposure ratio is calculated by dividing the maximum sum auto exposure value by the desired maximum brightness.

16. The storage medium as claimed in claim 9, wherein the average exposure ratio is calculated by dividing the average sum auto exposure value by the desired average brightness.

17. The storage medium as claimed in claim 9, wherein the first subpixel is a R-subpixel, the second subpixel is a G-subpixel and the third subpixel is a B-subpixel.

18. The storage medium as claimed in claim 9, wherein the processing system further comprising:
an image-sensing unit for sensing and capturing image information; and
a storage unit for saving the images.

19. The storage medium as claimed in claim 18, wherein the processing system further comprising:
a lens module; and
a motor driving device for moving the lens module or the image-sensing unit to positions where the storage medium is focused.

20. The storage medium as claimed in claim 19, wherein the storage medium is an image extraction apparatus.

* * * * *